US008144356B2

(12) United States Patent
Meyerhofer

(10) Patent No.: US 8,144,356 B2
(45) Date of Patent: *Mar. 27, 2012

(54) PROMOTIONAL CONTROLLER FOR FINANCIAL TRANSACTIONS

(75) Inventor: Mark Meyerhofer, La Canada, CA (US)

(73) Assignee: FutureLogic, Inc., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,348

(22) Filed: Feb. 22, 2010

(65) Prior Publication Data

US 2010/0253973 A1    Oct. 7, 2010

Related U.S. Application Data

(63) Continuation of application No. 10/434,306, filed on May 7, 2003, now Pat. No. 7,666,078.

(60) Provisional application No. 60/378,491, filed on May 7, 2002.

(51) Int. Cl.
*G06F 3/012* (2006.01)
*G06Q 30/00* (2006.01)
*G06F 17/00* (2006.01)

(52) U.S. Cl. ............. 358/1.15; 358/1.13; 358/1.18; 358/1.1; 705/14.1; 705/14.23; 705/14.11; 700/231

(58) Field of Classification Search ............ 463/25, 463/16, 1, 29, 36–43; 358/1.1, 1.15–1.18; 700/236, 231, 232; 705/14, 14.1, 14.11, 705/14.12, 14.23–14.25; 710/11, 17
See application file for complete search history.

(56) References Cited

U.S. PATENT DOCUMENTS

| | | | |
|---|---|---|---|
| 4,412,292 A | 10/1983 | Sedam et al. | |
| 4,602,279 A | 7/1986 | Freeman | |
| 4,723,212 A | 2/1988 | Mindrum et al. | |

(Continued)

FOREIGN PATENT DOCUMENTS

EP    0173835 A2    3/1986

OTHER PUBLICATIONS

Futurelogic, Inc., "Heavy Duty Dollar Bill Size Direct Thermal Kiosk Printer User's Manual", Copyright 2000.

(Continued)

*Primary Examiner* — Twyler Haskins
*Assistant Examiner* — Chad Dickerson

(57) ABSTRACT

A method and apparatus for a vending promotional printer for use within a vending machine are disclosed. A vending promotional printer includes a coupon database describing a stack of coupons that are specified using a template based couponing printer language. A coupon is selected for creation and issued to the customer based on a matrix of event-based triggers involving factors or parameters known to the vending promotional printer directly or supplied by master promotional controller. Triggers may include the time of day, the date or amount of a cash-out voucher to be issued to a customer, the duration of play on a vending machine, a customer classification, the amount of money or credits added to a game, or a random frequency of coupon issuance having satisfied any or all of the aforementioned factors. The vending promotional printer may further include the ability to store all of the coupons, trigger conditions, and related information resident in the vending promotional printer in a non-volatile fashion thus enabling a host system to download a promotional environment into the vending promotional printer which will run promotional campaigns on behalf of the hosting system.

23 Claims, 9 Drawing Sheets

U.S. PATENT DOCUMENTS

| | | | |
|---|---|---|---|
| 4,783,747 A | 11/1988 | Komori et al. | |
| 4,910,672 A | 3/1990 | Off et al. | |
| 5,075,874 A | 12/1991 | Steeves et al. | |
| 5,091,713 A * | 2/1992 | Horne et al. | 340/541 |
| 5,174,056 A | 12/1992 | King | |
| 5,256,863 A | 10/1993 | Ferguson et al. | |
| 5,290,033 A | 3/1994 | Bittner et al. | |
| 5,503,483 A | 4/1996 | Petteruti | |
| 5,568,612 A | 10/1996 | Barrett | |
| 5,594,920 A | 1/1997 | Ebina | |
| 5,608,643 A | 3/1997 | Wichter et al. | |
| 5,612,868 A | 3/1997 | Off et al. | |
| 5,620,079 A | 4/1997 | Molbak | |
| 5,699,493 A | 12/1997 | Davidson et al. | |
| 5,710,887 A | 1/1998 | Chelliah | |
| 5,791,790 A | 8/1998 | Bender | |
| 5,816,918 A | 10/1998 | Kelly et al. | |
| 5,848,396 A | 12/1998 | Gerace | |
| 5,908,354 A | 6/1999 | Okuniewicz | |
| 5,909,673 A | 6/1999 | Gregory | |
| 5,943,241 A | 8/1999 | Nichols et al. | |
| 5,982,997 A | 11/1999 | Stone et al. | |
| 5,991,735 A | 11/1999 | Gerace | |
| 6,015,344 A * | 1/2000 | Kelly et al. | 463/16 |
| 6,046,817 A | 4/2000 | Brown | |
| 6,048,269 A | 4/2000 | Burns et al. | |
| 6,056,194 A | 5/2000 | Kolls | |
| 6,094,644 A | 7/2000 | Hillson | |
| 6,113,098 A | 9/2000 | Adams | |
| 6,118,860 A | 9/2000 | Hillson | |
| 6,141,684 A | 10/2000 | McDonald | |
| 6,146,276 A | 11/2000 | Okuniewicz | |
| 6,181,981 B1 * | 1/2001 | Varga et al. | 700/236 |
| 6,243,450 B1 | 6/2001 | Jansen | |
| 6,321,985 B1 | 11/2001 | Kolls | |
| 6,324,528 B1 | 11/2001 | Hillson | |
| 6,327,044 B1 | 12/2001 | Shima | |
| 6,394,907 B1 | 5/2002 | Rowe | |
| 6,415,341 B1 | 7/2002 | Fry, Sr. et al. | |
| 6,493,104 B1 | 12/2002 | Cromer et al. | |
| 6,511,377 B1 * | 1/2003 | Weiss | 463/25 |
| 6,575,090 B1 | 6/2003 | Vienneau et al. | |
| 6,612,984 B1 | 9/2003 | Kerr | |
| 6,620,046 B2 | 9/2003 | Rowe | |
| 6,647,437 B2 | 11/2003 | Ackerman et al. | |
| 6,840,860 B1 | 1/2005 | Okuniewicz | |
| 6,862,575 B1 | 3/2005 | Anttila et al. | |
| 6,874,612 B1 | 4/2005 | Uland | |
| 6,892,182 B1 | 5/2005 | Rowe et al. | |
| 6,896,618 B2 | 5/2005 | Benoy et al. | |
| 6,923,721 B2 | 8/2005 | Luciano et al. | |
| 6,924,903 B2 | 8/2005 | Brooks et al. | |
| 6,990,392 B1 | 1/2006 | Meister et al. | |
| 7,008,320 B2 * | 3/2006 | Rowe et al. | 463/25 |
| 7,099,035 B2 | 8/2006 | Brooks et al. | |
| 7,134,962 B2 | 11/2006 | Meyerhofer | |
| 7,376,580 B1 | 5/2008 | Walker et al. | |
| 7,594,855 B2 | 9/2009 | Meyerhofer | |
| 7,785,193 B2 | 8/2010 | Paulsen | |
| 7,871,325 B2 | 1/2011 | Okuniewicz | |
| 7,922,577 B2 | 4/2011 | Okuniewicz | |
| 2001/0048374 A1 | 12/2001 | Blad | |
| 2002/0034977 A1 | 3/2002 | Burns et al. | |
| 2002/0055906 A1 | 5/2002 | Katz et al. | |
| 2002/0077901 A1 | 6/2002 | Katz | |
| 2002/0094855 A1 | 7/2002 | Berman | |
| 2002/0099604 A1 | 7/2002 | Lewis et al. | |
| 2002/0099608 A1 | 7/2002 | Pons et al. | |
| 2002/0107065 A1 | 8/2002 | Rowe | |
| 2002/0111210 A1 | 8/2002 | Luciano et al. | |
| 2002/0113124 A1 | 8/2002 | Meyerhofer et al. | |
| 2003/0013513 A1 | 1/2003 | Rowe et al. | |
| 2003/0013527 A1 * | 1/2003 | Rowe et al. | 463/42 |
| 2003/0062378 A1 * | 4/2003 | Cooke et al. | 221/124 |
| 2003/0148812 A1 | 8/2003 | Paulsen et al. | |
| 2003/0186739 A1 | 10/2003 | Paulsen et al. | |
| 2004/0053681 A1 | 3/2004 | Jordan et al. | |
| 2008/0033594 A1 * | 2/2008 | Packes et al. | 700/232 |

OTHER PUBLICATIONS

Futurelogic, Inc., "Operators and Technicians Manual", Copyright 2003.
"EZ-Load Thermal Printer Owner's Manual", Copyright 2003, Nanoptix, Inc.
"Paycheck Printer™, Technicians Manual", Copyright 2003, Nanoptix, Inc.
"Nanoptix, Inc.'s Responses to Futurelogic, Inc.'s First Set of Interrogatories", submitted in Case No. 2:10-CV-7678-JFW(DTB).
Draft of "Nanoptix, Inc.'s First Amended Answer and Counterclaims", from Case No. 2:10-CV-7678-JFW(DTB).
Exhibit 10 of "Nanoptix, Inc.'s First Amended Answer and Counterclaims", from Case No. 2:10-CV-7678-JFW(DTB).
Exhibit 11 of "Nanoptix, Inc.'s First Amended Answer and Counterclaims", from Case No. 2:10-CV-7678-JFW(DTB).
Exhibit 12 of "Nanoptix, Inc.'s First Amended Answer and Counterclaims", from Case No. 2:10-CV-7678-JFW(DTB).
Exhibit 14 of "Nanoptix, Inc.'s First Amended Answer and Counterclaims", from Case No. 2:10-CV-7678-JFW(DTB).
Exhibit 15 of "Nanoptix, Inc.'s First Amended Answer and Counterclaims", from Case No. 2:10-CV-7678-JFW(DTB).
Exhibit 16 of "Nanoptix, Inc.'s First Amended Answer and Counterclaims", from Case No. 2:10-CV-7678-JFW(DTB).
Exhibit 17 of "Nanoptix, Inc.'S First Amended Answer and Counterclaims", from Case No. 2:10-CV-7678-JFW(DTB).
Exhibit 18 of "Nanoptix, Inc.'S First Amended Answer and Counterclaims", from Case No. 2:10-CV-7678-JFW(DTB).
Exhibit 19 of "Nanoptix, Inc.'s First Amended Answer and Counterclaims", from Case No. 2:10-CV-7678-JFW(DTB).
Exhibit 20 of "Nanoptix, Inc.'s First Amended Answer and Counterclaims", from Case No2:10-CV-7678-JFW(DTB).
"Confidential Depo: M. Meyerhofer—Vol. 1", from Case No. 2:10-CV-7678-JFW(DTB).
"Meyerhofer, Mark (Vol. 01) (New) Jul. 27, 2011", partial deposition from Case No. 2:10-CV-7678- JFW(DTB).
"Confidential Depo: M. Meyerhofer—Vol. 2", from Case No. 2:10-CV-7678-JFW(DTB).
Email, FL0023326, from Case No. 2:10-CV-7678-JFW(DTB).
Email, FL0020624, from Case No. 2:10-CV-7678-JFW(DTB).
Email, FL0002923, from Case No. 2:10-CV-7678-JFW(DTB).
Agenda, 11859B_MEYERHOFER_07_27_11_129, from Case No. 2:10-CV-7678-JFW(DTB).
Email, 11859B_MEYERHOFER_07_27_11_123, from Case No. 2:10-CV-7678-JFW(DTB).
Email, 11859B_MEYERHOFER_07_27_11_122, from Case No. 2:10-CV-7678-JFW(DTB).
Email, 11859B_MEYERHOFER_07_27_11_121, from Case No. 2:10-CV-7678-JFW(DTB).
Email, 11859B_MEYERHOFER_07_27_11_118, from Case No. 2:10-CV-7678-JFW(DTB)..
Letter, 11859B_MEYERHOFER_07_27_11_117, from Case No. 2:10-CV-7678-JFW(DTB).
Functional Product Specification, 11859B_MEYERHOFER_07_27_11_114, from Case No. 2:10-CV-7678-JFW(DTB).
"First Expert Report of Kendyl A. Román" from Case No. 2:10-CV-7678-JFW(DTB).
Exhibit 6A Summary of Certain Prior Patents Regarding Independent Claims from "First Expert Report of Kendyl A. Román" from Case No.2:10-CV-7678-JFW(DTB).
Exhibits 6b to 6T Invalidity Charts, from "First Expert Report of Kendyl A. Román" from Case No. 2:10-CV-7678-JFW(DTB).
Exhibit 4, Image Writer pictures, from "First Expert Report of Kendyl A. Román" from Case 2:10-CV-7678-JFW(DTB).
Exhibit 8, File History Excerpts, from "First Expert Report of Kendyl A. Román" from Case No. 2:10-CV-7678-JFW(DTB).
Office action regarding U.S. Appl. No. 12/562,046, Nov. 7, 2011.

* cited by examiner

PROMOTIONAL CONTROLLER FOR FINANCIAL TRANSACTIONS

CROSS-REFERENCE TO RELATED APPLICATION

This application is a continuation of application Ser. No. 10/434,306, filed May 7, 2003, now U.S. Pat. No. 7,666,078, which claims the priority of U.S. Provisional Patent Application No. 60/378,491, filed May 7, 2002, the entire contents of each of which are hereby incorporated by reference herein.

BACKGROUND OF THE INVENTION

This invention relates generally to printers and connected hardware used in vending machines and more specifically to promotional ticket printing, promotional databases, and promotional ticket triggering within a vending machine printing environment.

The vending machine manufacturing industry provides a variety of vending machines configured as self serve kiosks for dispensing various foods, drinks, and other material products. An exemplary vending machine is a soft drink vending machine. Vending machines are usually found in locations where people would congregate or be passing through and require snacks, food, or other goods.

Vending machine manufacturers have more recently introduced intelligent, network connected vending machines to the market and these have begun to find wide acceptance in that industry. These new vending machines are considered intelligent since they have capabilities of tracking their product sales and inventory levels, and reporting these to a central location via a hard wired land line or over a wireless communications link. This information may then be used to schedule route restocking schedules and for market analysis.

Initial testing of the network connected vending machines have been positive, and this initial success practically guarantees a wide installed base of networked vending machines with a customer audience captive during the vend process. This installed base opens up tremendous electronic promotional opportunities.

SUMMARY OF THE INVENTION

In one aspect of the invention, a method of printing a promotional coupon in a vending environment includes receiving coupon data by a vending promotional printer in a cashless enabled game from a promotional controller via a communications network. The coupon data includes a coupon description written in a template definition language. The vending promotional printer then generates the coupon using variable data and the coupon template in response to a trigger.

In another aspect of the invention, the variable data is received by the vending promotional printer from the promotional controller via the communications network. In this aspect, the promotional controller generates the trigger and transmits the trigger to the vending promotional printer via the communications network.

In another aspect of the invention, the coupon data includes trigger control parameters and the trigger is generated by the vending promotional printer using the trigger control parameters and trigger data. The trigger data may include a date, a time of day, a frequency of issuance of the coupon, or a time of play by a player of a vending machine.

In another aspect of the invention, the vending promotional printer is further coupled to a vending machine controller and the trigger data is received by the vending promotional printer from a vending machine controller. The trigger data may include a player identifier, an amount of money in play on a vending machine, a duration of a current session of play of a vending machine, a cash-in of a player or a cash-out of a player.

In another aspect of the invention, coupon issuance data is stored by the vending promotional printer and the coupon issuance data is transmitted by the vending promotional printer to the promotional controller via the communications network.

In another aspect of the invention, a promotional controller transmits coupon data to a vending promotional printer via a communications network with the coupon data including a coupon template. The promotional controller transmits variable data and trigger data to the vending promotional printer via the communications network. In response to the transmission, the vending promotional printer generates a coupon using the coupon template and the variable data.

In another aspect of the invention, the vending promotional printer stores coupon issuance data and the promotional controller receives the coupon issuance data by the promotional controller from the vending promotional printer via the communications network.

In another aspect of the invention, a vending promotional printer comprises a processor and a memory coupled to the processor. The memory has stored program instructions executable by the processor where the program instructions include receiving coupon data including a coupon template from a promotional controller via a communications network. The program instructions for the vending promotional printer also include instructions for generating a coupon using variable data and the coupon template in response to a trigger.

In another aspect of the invention, a promotional controller includes a processor and a memory coupled to the processor. Program instructions for implementing the features of a promotional controller are stored in the memory and are executable by the processor. The program instructions include: transmitting coupon data to a vending promotional printer via a communications network wherein the coupon data includes a coupon template; transmitting variable data to the vending promotional printer via the communications network; and transmitting trigger data to the vending promotional printer whereby the vending promotional printer generates a coupon using the coupon template and the variable data in response to the trigger data.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
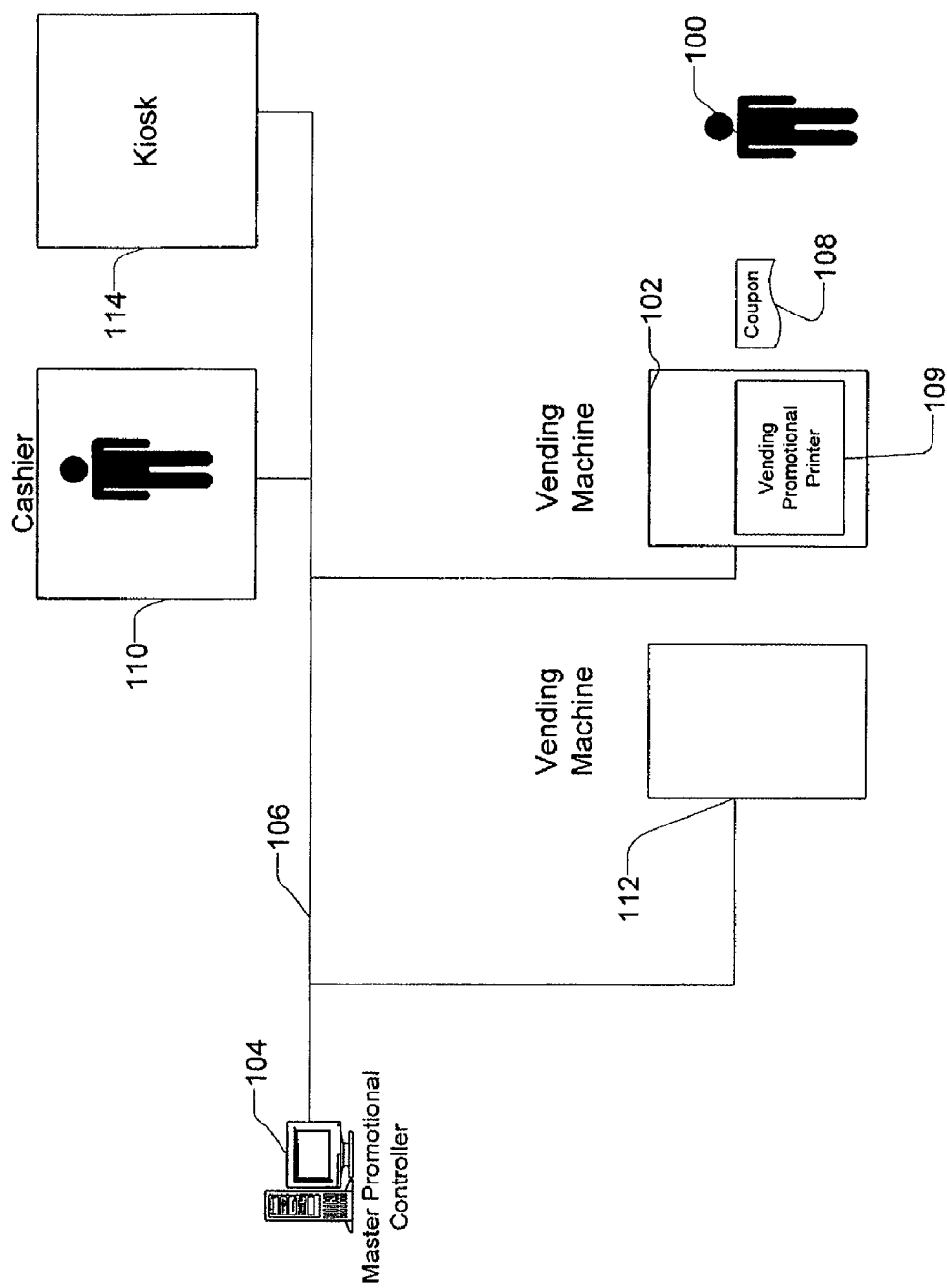
FIG. 1 is block diagram illustrating a vending environment employing coupon issuance in accordance with an exemplary embodiment of the present invention.

FIG. 1 is block diagram illustrating a vending environment employing couponing in accordance with an exemplary embodiment of the present invention. A customer 100 uses a vending machine 102 to buy a snack, soft drink, or other item. When the customer buys the item, a master promotional controller 104 coupled to one or more vending machines through a communications network 106 triggers the generation of promotional coupons 108 for use by the customer. The promotional coupons are generated by a vending promotional printer 109 included in a vending machine. The master promotional controller can either be a controller network connected to one or more vending promotional printers, a controller within a vending machine or vending promotional printer, or an intelligent routing and management device for one or more vending promotional printers. In one embodiment of a master promotional controller, the master promotional controller directs the promotional activity of the vending promotional printers via direct promotional coupon requests. In another embodiment of a master promotional controller, the master promotional controller uses a vending machine's vending promotional printer to store promotional coupon databases and triggers.

Once a promotional coupon has been issued by a vending promotional printer, the promotional coupon may be redeemed with a human operator or cashier 110, or redeemed automatically through another redemption device, such as a bill acceptor in another vending machine 112, or redeemed at a kiosk 114 which is not a vending machine but provides some other form of automatic interface for a promotional coupon holder.

In one embodiment of a master promotional controller, the master promotional controller is coupled to the redemption devices. In another embodiment of an master promotional controller, a non-vending kiosk or cashier personnel may or may not interface back to the master promotional controller when redeeming a promotional coupon. Information relative to couponing activity is exchanged with the master promotional controller, the net result being the vending promotional printers fitting into the system as distributed intelligent sub-units, significantly off-loading the master promotional controller's real time servicing requirements and avoiding network bandwidth issues associated with live streaming of promotional coupons during a relatively short vend time window.

In one vending environment employing couponing in accordance with an exemplary embodiment of the present invention, each vending promotional printer in the vending environment has a unique address or identifier so that a population of vending promotional printers on the network can be addressed in whole or individually for promotional purposes.

Figure 2:
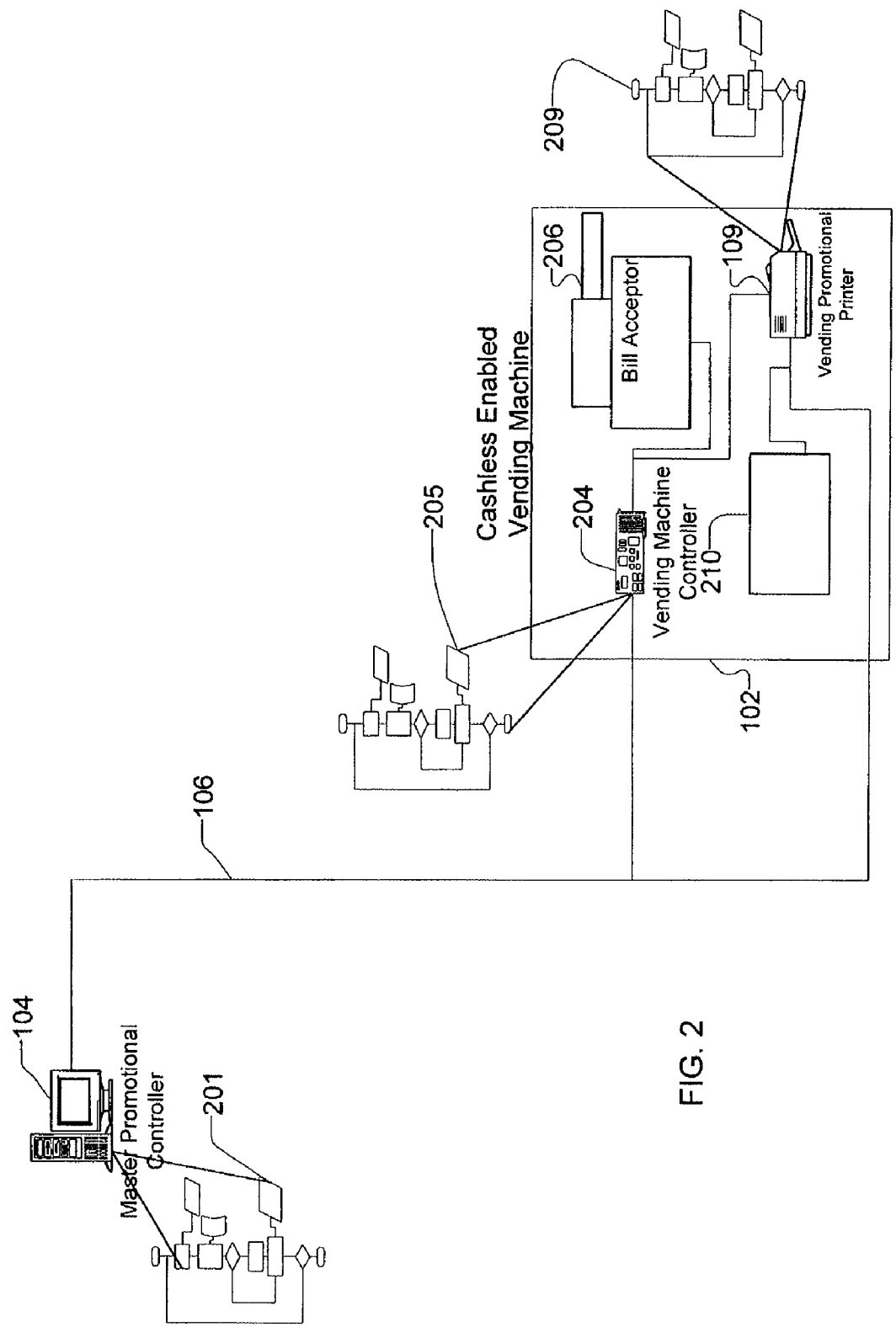
FIG. 2 is a deployment diagram of a coupon issuing system in accordance with an exemplary embodiment of the present invention.

FIG. 2 is a deployment diagram of a couponing system in accordance with an exemplary embodiment of the present invention. In a couponing system, a master promotional controller 104 is coupled to one or more vending machines, as illustrated by vending machine 102, through a communications network 106 by coupling to a vending promotional printer 109 included in the vending machine. The master promotional controller is programmable and includes master promotional controller programming instructions 201 controlling the master promotional controllers operations including communications with the vending promotional printer.

In one vending promotional printer in accordance with an exemplary embodiment of the present invention, a stand-alone vending promotional printer includes all of the necessary processing capabilities, memory, and vending promotional printer programming instructions 209 needed to perform promotional couponing operations for the vending machine. In other embodiments of vending promotional printers, a vending promotional printer is created by coupling a promotional module 210 to a conventional vending printer, enabling the vending printer to function as a vending promotional printer. A stand-alone vending promotional printer or a vending promotional printer created from a conventional vending printer coupled to a promotional module are hereinafter termed a "vending promotional printer".

The master promotional controller may be coupled to a vending machine controller 204 included in the vending machine. By coupling to a vending machine controller, the master promotional controller may receive information from the vending machine controller about the vending operations of the vending machine separately from the vending promotional printer printing operations.

The vending machine may also include a bill acceptor 206 coupled to the vending machine controller. A vending machine uses a bill acceptor for redemption of promotional coupons and acceptance of vouchers or cash.

In operation, the master promotional controller transmits packets of variable data or coupon data describing a promotional database to the vending promotional printer. The contents of the promotional database include descriptions of a plurality of promotional coupons, cash vouchers, advertisements or other enticements which are hereinafter collectively referred to as "coupons". The vending promotional printer receives the promotional database and stores the promotional database in the vending promotional printer's local memory.

The vending promotional printer also stores specifications of how to print the coupons in its local memory. The specifications of the coupons are stored as templates written in a template-based printer language. This allows the coupons to be pre-defined, formatted, and stored in the vending promotional printer completely or partially for later recall.

Upon reception of a trigger data signal from either the master promotional controller or the vending machine controller, the vending promotional printer references and parses the promotional database and coupon templates to generate and issue promotional coupons or tickets printed on paper media. The paper media may be used specifically for the purpose of generating promotional coupons, or the paper media may be used for the purpose of printing vouchers associated with vending.

Figure 3:
FIG. 3 is an illustration of a coupon including logical fields described in a template based printer language in accordance with an exemplary embodiment of the present invention.

FIG. 3 is an illustration of a coupon including logical fields described in a template based printer language in accordance with an exemplary embodiment of the present invention. In this example, a coupon may 300 include four types of data fields: text fields, such as text field 302; barcode fields, such as barcode field 304; graphic fields, such as graphic field 306; and line/box draw fields, such as line/box draw field 308. The fields of a coupon are described using coupon description data included in an electronic template that may be stored by a vending promotional printer. A template may include a plurality of fields in combination, resulting in a paste-up style printed coupon. A plurality of templates describing different types of coupons may be stored in a vending promotional printer supporting a rich couponing environment.

The actual value or data for each of the fields described in a coupon template may or may not be included in the template itself. For example, a template may include a barcode field for printing a barcode 310. However, the actual value of the barcode is transmitted to a vending promotional printer at the time a coupon is generated using the coupon template. In this way, a coupon may have fields that include static data, such as graphic 312 in a graphic field, or dynamic data, such as the name of a particular patron 314 in a text field. In this way, customized coupons may be printed by a vending promotional printer without transferring large amounts of data through a communications network coupling a vending promotional printer to a master promotional controller.

In addition, data that is used to track usage of coupons may be included in a coupon. For example, a barcode field or a text field may be used to print a barcode value or text string uniquely identifying a coupon. In this way, a vending provisional printer creates an image of a barcode or barcodes, characters or marks that may be read by a vending machine bill acceptor on the same or another vending machine, allowing automatic acceptance of coupons into a vending system distributed across more than one location.

A coupon template includes a plurality of command strings. Each command string conforms to the following syntax:

delimiter<cmd_Ltr>|<data_field1>| . . . |<data_fieldx>| delimeter; comment where:
    delimiter=a delimiter character
    <cmd_ltr>=command identifier letter
    <data fields1-x>=fields which include information relative to the command
    |=Pipe character. This serves as the delimiter between data fields in a command.
    ;=Semi-colon. This is a comment field designator.

A template defining a coupon adheres to following syntax:
delimiter<template_cmd_ltr>|<t_id>|<targ_mem>|<t_dim_da>|<t_dim_pa>|<pr#1>|<pr#2>| . . . |<pr#n>|delimiter
where:
    <t_id>=Template I.D.
    <targ_mem>=target memory storage.
    <t_dim_da>=Template dimension on a dotline axis in dots.
    <t_dim_pa>=Template dimension in dots in the paper axis.
    <pr#1> . . . <pr#n>=list of coupon database resident print regions ID's used in the format of this coupon. These fields are the method by which print regions used on a coupon are linked together and to the coupon template.

A print region is a print field used in a template to format print data. The print region command is used to define the basic types of print regions such as text, barcode, graphics, and a line/box draw.

A define print region command defines the particular font, barcode, graphic, or line style which is to be used, and provides special formatting information on how it is to be used. Multiple print regions may be defined and memorized in a vending promotional printer's coupon database.

A define print region command adheres to the follow syntax:
delimiter<print_region_cmd_ltr>|<r_id>|<targ_mem>|<da_start>|<pa_start>|<da_len>|<pa_len>|<rot>|<just>|<obj_id>|<mul_1>|<mul_2>|<obj_att>|<pr_att>|<pr_data>|delimter
where:
    <r_id>=print region identifier.
    <targ_mem>=target memory storage.
    <da_start>=dot axis start position in dots.
    <pa_start>=paper axis start position in dots.
    <da_len>=dot axis length of print region in dots.
    <pa_len>=paper axis length of print region in dots.
    <rot>=rotation of strings or data within print region.
    <just>=justification of data within print region.
    <obj_id>=print object identifier. Range 1 byte. This is the print object (barcode, font, line/box or graphic) used to format print the data from a print command.
    <mul_1>=Print object multiplier 1. For text, it is a font width multiplier. For barcodes, it indicates narrow bar width or modulo bar width. For a line, this represents thickness of the line in dots.
    <mul_2>=Print object multiplier 2. For text, this represents a font height multiplier. For a barcode, it indicates a wide bar width.
    <obj_att>=object printing attributes. This contains special instructions on how to treat the print objects within a print region
    <pr_att>=print region attributes. This contains special instructions on handling of the print region. A '0' indicates text will be sent in a print batch command. A '1' indicates use text which follows in pr_data field for a print region. A '2' indicates a print region will auto increment with each coupon in a batch. The base value is stored in a pr_data field. A '3' indicates an auto-decrement print region which will auto-decrement with each coupon in a batch. The base value is stored in a pr_data field.
    <pr_data>=permanently stored data which always appears in this print region. This field contains stored text if requested by entering a '2' in <pr_att> field.

A library command is used to manage defined graphics. A library command adheres to the following syntax:
delimiter<library_cmd_ltr>|<lib_funct>|<mem>|<obj_id>|<mem_req>|<ld_file_size>|obj_data delimiter
where:
    <lib_funct>=operation to perform: 'A'—add object, enter download mode, 'D'—delete object.
    <mem>=target memory in which to place the object being downloaded.
    <obj_id>=object identification. This is the object I.D. byte.
    <mem_req>=memory usage specifier. For loading a graphic: size of a graphic file. The library command header is terminated after this field and obj_data is expected immediately following. For deleting graphics: 'G' is used in this field.
    <ld_file_size>=file size indicator.
    obj_data=object data (font or graphic) in appropriate format if <lib_funct>='A'. Format for graphics: PCX.

Figure 4:
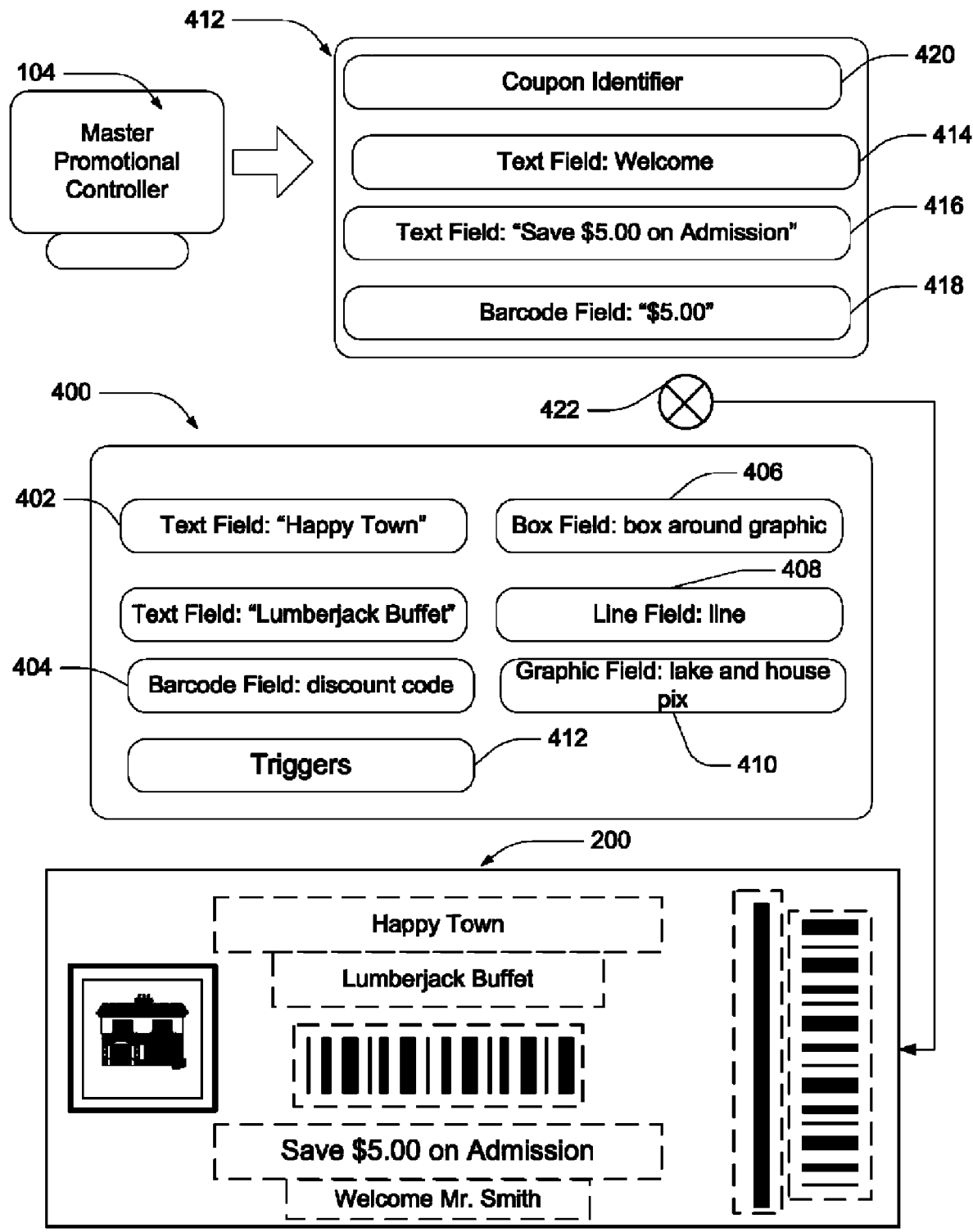
FIG. 4 is a block diagram of coupon template field elements stored partially resident in a vending promotional printer and partially supplied by a master promotional controller at the time of print and issue in accordance with an exemplary embodiment of the present invention.

FIG. 4 is a block diagram of coupon template field element stored partially resident in a vending promotional printer and partially supplied by a master promotional controller at the time of print and issue in accordance with an exemplary embodiment of the present invention. FIG. 4 illustrates how a master promotional controller selects a type of coupon and transmits particulars, such as variable data to be placed in fields in the coupon, for each print and issuance event. Values for the fields that make up a coupon 300 may be divided into two groups or sets. A resident variable data set 400 may be stored locally in a vending promotional printer. The resident set of variable data may include variable data such as: variable data for a text field containing an identifier of a vending location 402; variable data for a barcode field identifying a type of promotion 404; a template description used to generate a graphic such as box variable data 406 or line variable data 408; or an identifier or actual variable data for a graphic 410. A dynamic variable data set include variable data for fields having variable data that are stored in the vending promotional printer and are saved in a template definition for a particular coupon. Examples of variable data in a dynamic variable data set include: text variable data for a customer identifier or welcoming message 414; text variable data describing a promotion item 416; and barcode variable data 418 for quantifying a value of a promotion for printing on the coupon.

Both variable data sets may be transmitted from a master promotional controller 104 to a vending promotional printer in the form of communication packets. When a vending promotional printer receives a variable data set, the vending promotional printer stores the variable data set for future use. A resident variable data set includes variable data that may be reused for generating many coupons; therefore, a resident variable data set may be stored in he vending promotional printer for an extended period of time. In contrast, a dynamic variable data set may be used for a short period of time, perhaps for even a single generation of a single coupon. As such, the dynamic variable data set and static variable data set associated in a coupon may be transmitted to a vending promotional printer at different times. To retain association between the variable data sets, part of the communication packet issued by the master promotional controller may include a reference 420 to a template definition so that the dynamic data in the communication packet can be combined 422 with the static field data stored in a vending promotional printer to generate a complete coupon 200.

Since it is possible to store all fields used in a coupon within the vending promotional printer's memory, a master promotional controller may issue a complete coupon by simply sending a reference to a coupon so defined to generate a coupon in its entirety. It is also possible for a master promotional controller to offload the entire live communication burden by sending a complete coupon database including triggers during off-peak times.

In one embodiment of a vending promotional printer, a vending promotional printer is triggered to print coupons from the vending promotional printer's internal database under direct control of a master promotional controller that triggers the issuance of a coupon and conveys any pertinent variable information associated with the coupon such as promotion type, face value of the coupon, date of expiration and the like.

Figure 5:
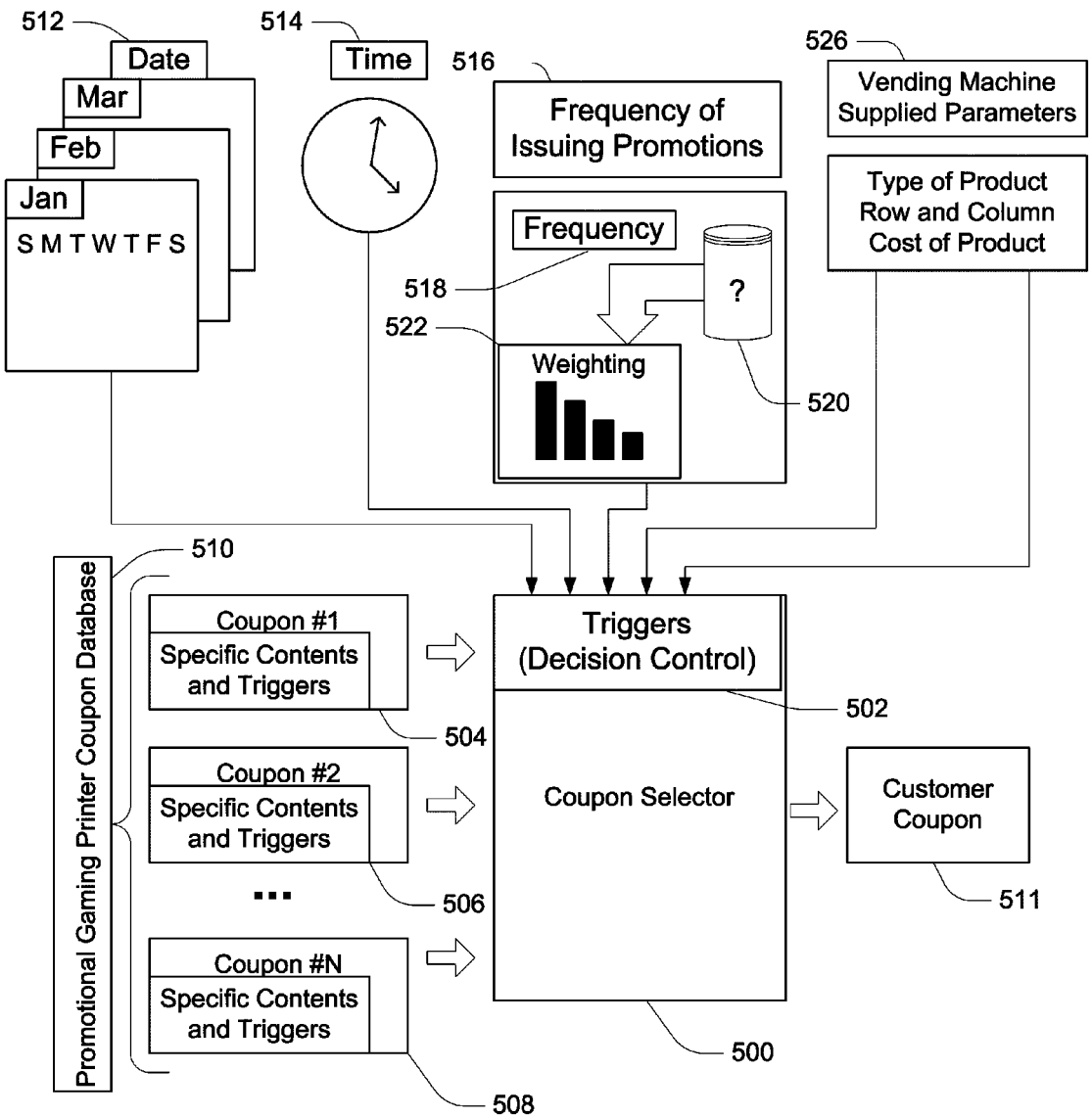
FIG. 5 is a block diagram of an exemplary coupon "stack" and logical trigger matrix resident in a vending promotional printer in accordance with an exemplary embodiment of the present invention.

FIG. 5 is a block diagram of an exemplary coupon stack and logical trigger matrix resident in a vending promotional printer in accordance with an exemplary embodiment of the present invention. As previously noted, a vending promotional printer may print a coupon in response to either internal or external event signals or trigger data. To respond to a trigger, a vending promotional printer includes a coupon selector logic module 500 that analyzes trigger data 502 as trigger data becomes available and determines which coupons should be printed in response to the trigger data. Coupons, such as coupons 504, 506, and 508, are stored in a coupon database 510 as a stack. The stack of coupons are a plurality of predefined coupons that can generate a coupon 511 anytime a set of trigger conditions to which a coupon is associated is satisfied. These trigger conditions can operate independently or in logical combination.

Exemplary logical trigger data utilized in a vending promotional printer for initiating generation of coupons includes: date 512, time of vend 514, frequency of issuance of a particular coupon 516, and vending machine issued parameters 526 to the printer such as type of product, location within the vending machine (such as a row and column) or cost of the product being vended and the like. By utilizing the illustrated trigger matrix, it is possible for a vending promotional printer to issue coupons without any information provided by a master promotional controller at the time of a cash-in, vend, or completion of a vending session.

In one vending promotional printer in accordance with an exemplary embodiment of the invention, the vending promotional printer receives from a master promotional controller a coupon trigger database thereby enabling the vending promotional printer to self-manage its couponing activity. The coupon trigger database may include different types of trigger control parameters including: anytime a product is issued by the vending machine to the customer; a sale for greater than, equal to, or less than a specified amount of money occurs in the vending machine; the quantity of product which the customer purchases; the time at which the vending transaction occurs; the date at which vending transaction occurs; the physical row and column of the vending machine's storage matrix from which the product is issued ("vended"); a customer identifier, and the type of product vended.

In another aspect of the invention, a component of the vending promotional printer's internal database includes a set of control parameters that instruct the vending promotional printer to select the type, quantity, and frequency of coupons to create and issue related to any of the triggers listed above. These control parameters may operate separately or in combination with each coupon in the database. Parameters that may be used include: a total quantity of a coupon being issued before the coupon is retired from the coupon database; a frequency 518 of issuance of a coupon based on the number of occurrences of specified trigger events; a frequency of issuance of a coupon based on random odds 520, such as one in one hundred trigger events; a backup coupon or coupons should a particular coupon fail to print for lack of satisfying its specified set of qualifiers; whether or not the coupon is issued based on the time the trigger occurred; and whether the coupon is issued based on the date the trigger occurred.

In one embodiment of vending promotional printer, a real time clock electronic device is included within the vending promotional printer for the purposes of supporting time dependent promotional activity as described above.

Figure 6:
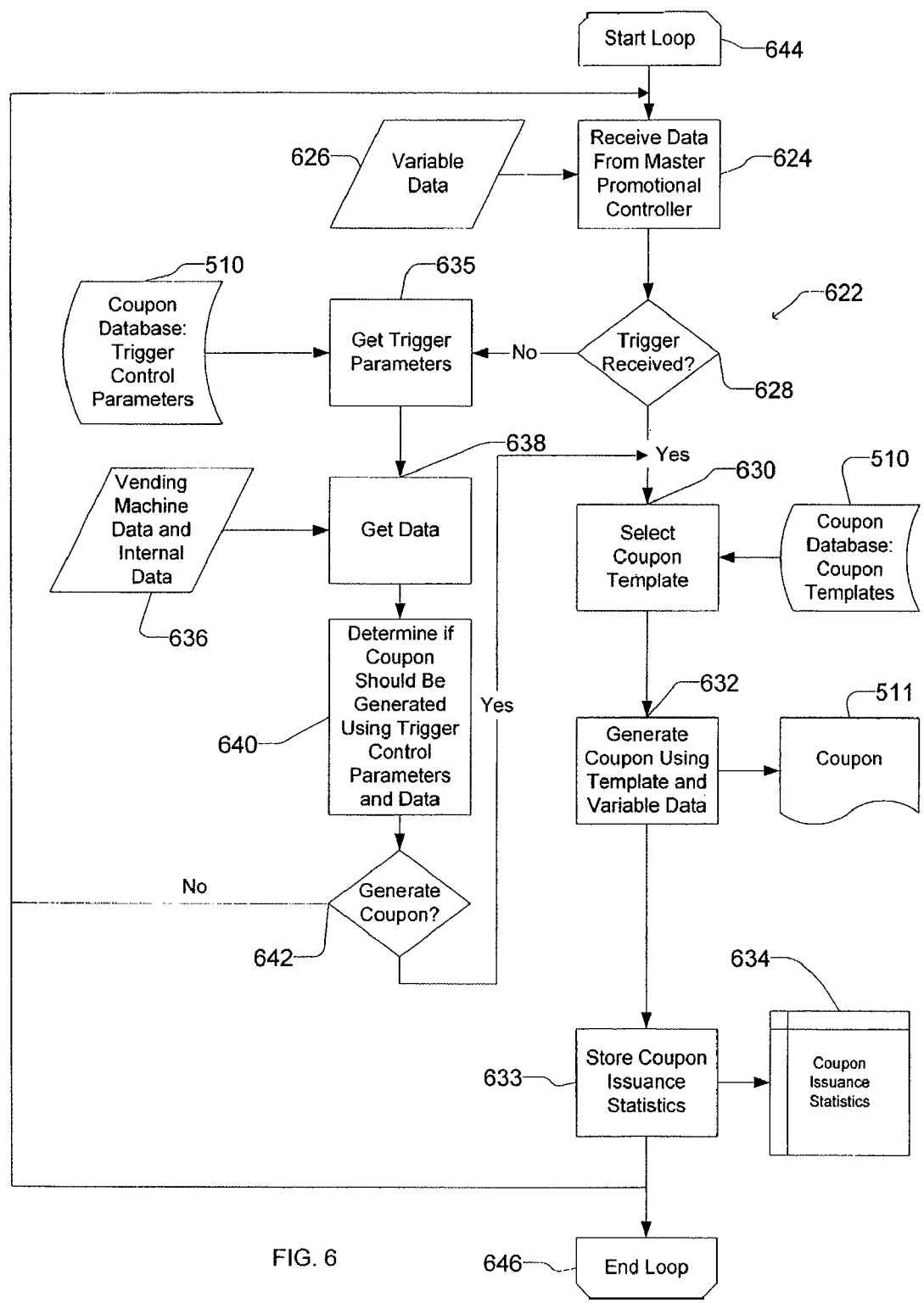
FIG. 6 is a process flow diagram of a coupon generation process in accordance with an exemplary embodiment of the present invention.

FIG. 6 is a process flow diagram of a trigger matrix process in accordance with an exemplary embodiment of the present invention. A trigger matrix process 622 is used by a vending promotional printer to determine if a coupon should be generated and issued to a customer. The trigger matrix process receives (624) variable data from a master promotional controller. The trigger matrix process determines (628) if the variable data includes a coupon trigger instructing the vending promotional printer to issue a coupon. If so, the trigger matrix process selects (630) an appropriate coupon to issue from a coupon database 510. The trigger matrix process then generates (632) a coupon 511 using the selected coupon template. In addition, the trigger matrix process may use a portion of the variable data received from the master promotional controller to customize the coupon when the coupon is generated. The trigger matrix process may then store (633) coupon issuance statistical data (634) for later retrieval by the master promotional controller.

A trigger matrix process may also initiate issuance of a coupon even if the master promotional controller does not transmit a trigger to the vending promotional printer. To do so, the matrix trigger process gets (635) trigger control parameters stored in the promotional coupon database 510 that correspond to stored coupon templates in the promotional coupon database. The trigger matrix process then gets (638) vending machine and other internal data 636 and determines (640) if a coupon should be issued using the data and trigger control parameters. If the trigger matrix process determines (642) that a coupon should be generated, the trigger matrix process issues a coupon as previously described, this time selecting a coupon template using the trigger control parameters.

The vending promotional printer is a real-time device meaning that it continuously processes incoming trigger data and triggers. As such, the trigger matrix process may be configured as an endless loop as indicated by the start loop 644 and stop loop 646 symbols.

Figure 7:
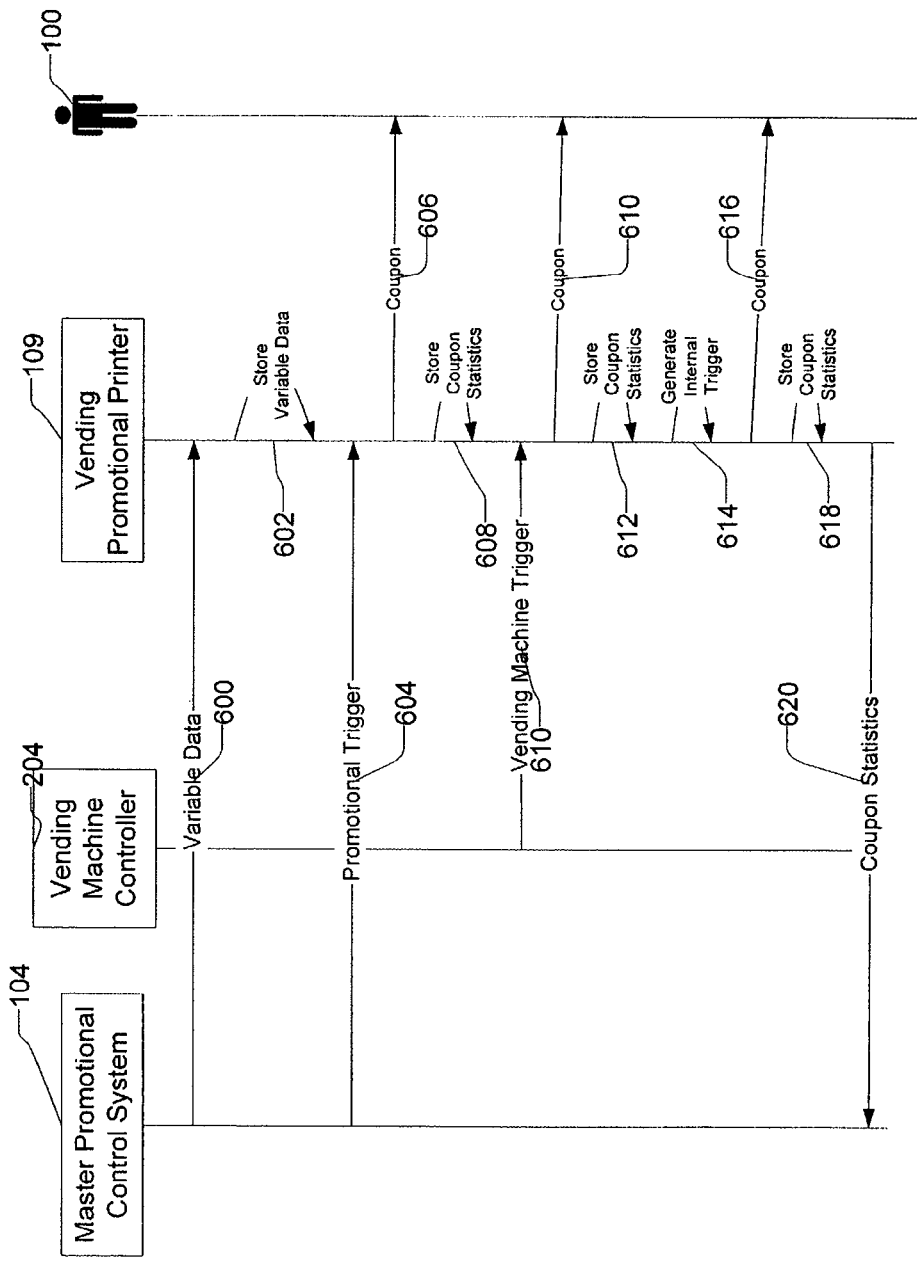
FIG. 7 is a sequence diagram of a coupon generating process in accordance with an exemplary embodiment of the present invention.

FIG. 7 is a sequence diagram of a coupon generating process in accordance with an exemplary embodiment of the present invention. A master promotional controller 104 transmits coupon or variable data 600 to a vending promotional printer 109. The vending promotional printer stores (602) the coupon data for later use by the vending promotional printer in printing a coupon. As previously described, the coupon data may include coupon templates, sets of dynamic and static variable data, trigger control parameters, and entire promotional coupon databases.

A vending promotional printer may receive various triggers that initiate generation of a coupon for a customer 100. The master promotional controller may transmit a promotional trigger (604) to the vending promotional printer. In response to the promotional trigger, the vending promotional printer generates a coupon 606 for use by the customer. The vending promotional printer then stores (608) statistical data about the just generated coupon. The vending promotional printer may also receive a vending machine trigger 610 from a vending machine controller 204 in a vending machine. In response to the vending machine trigger, the vending promotional printer generates a coupon 610 for use by the customer. The vending promotional printer then stores (612) statistical data about the just generated coupon. The vending promotional printer may also generate (614) an internal trigger on its own such that the vending promotional printer generates a coupon 616 for use by the customer. The vending promotional printer then stores (618) statistical data about the just generated coupon.

Periodically, or at the request of the master promotional controller, the vending promotional printer may transmit the saved coupon statistical data to the master promotional controller for analysis and other types of processing. The coupon tracking or statistical data may include details such as quantities of specific types of triggers received, quantities of each type of coupon issued, and the times and dates when triggers were received and coupons were issued.

In a vending promotional printer in accordance with an exemplary embodiment of the present invention, the vending promotional printer accepts promotional database loads and transfers statistical data with the master promotional controller either through a main communication port used for normally signaling pay out vouchers in the vending machine, or through an auxiliary port allowing the vending promotional printer's promotional activities to be conducted in series or in parallel with the vending promotional printer's voucher and coupon printing functions within the vending machine.

Figure 8:
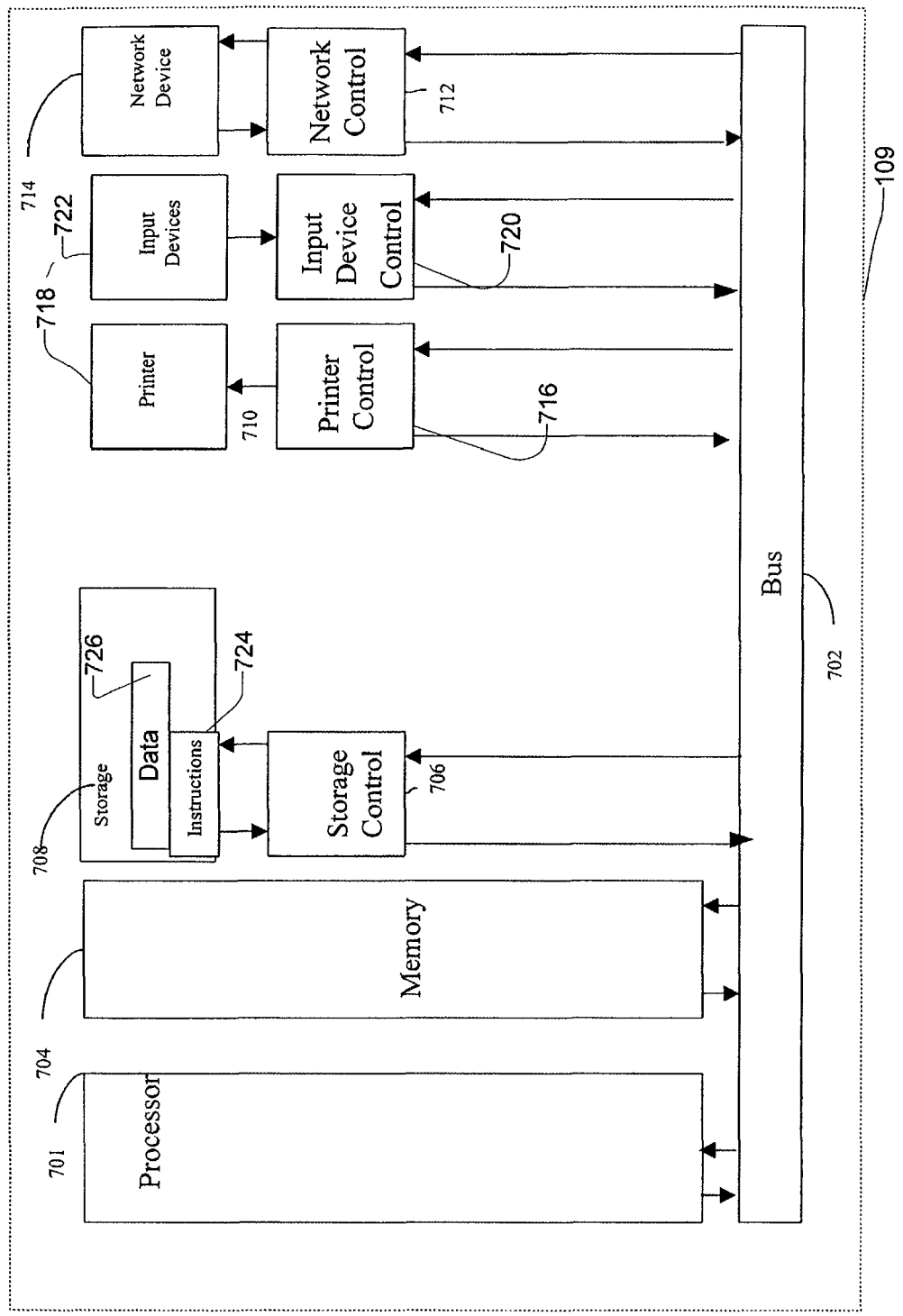
FIG. 8 is an architecture diagram of an exemplary vending promotional printer in accordance with an exemplary embodiment of the present invention.

FIG. 8 is an architecture diagram of an exemplary vending promotional printer in accordance with an exemplary embodiment of the present invention. A vending promotional printer 109 includes a processor 701 operatively coupled via a system bus 702 to a main memory 704. The processor is also coupled to a storage device 708 via a storage controller 706 and the bus. The storage device includes stored program instructions 724 and data 726 such as coupon variable data, coupon templates, and coupon trigger control parameters. In operation, the program instructions implementing a vending promotional printer are stored on the storage device until the processor retrieves the program instructions and stores them in the main memory. The processor then executes the computer program instructions stored in the main memory and operates on the data stored in the storage device to implement the features of a vending promotional printer as described above.

The processor is further coupled to a printer mechanism 718 through a printer controller 716 via the bus. In operation, the processor executes the program instructions to generate printer mechanism control signals and transmits these signals to the printer mechanism via the bus and printer controller. In response to the printer mechanism control signals, the printer mechanism prints coupons for use by a customer.

The processor is further coupled to external input devices 722 by an input device controller 720 via the bus. Example input devices include sensors that the vending promotional printer uses to detect proper printing of a coupon by the printer mechanism, coupon printer paper detectors, and real time clocks. The processor receives input device signals from the input devices via the input device controller and the bus and uses the input device signals to detect the state of the vending promotional printer's environment.

The processor is further coupled to a network device 714 via a network device controller 712 and the bus. The process uses the network device to communicate with other processing systems, such as a master promotional controller or a vending machine controller as previously described.

Figure 9:
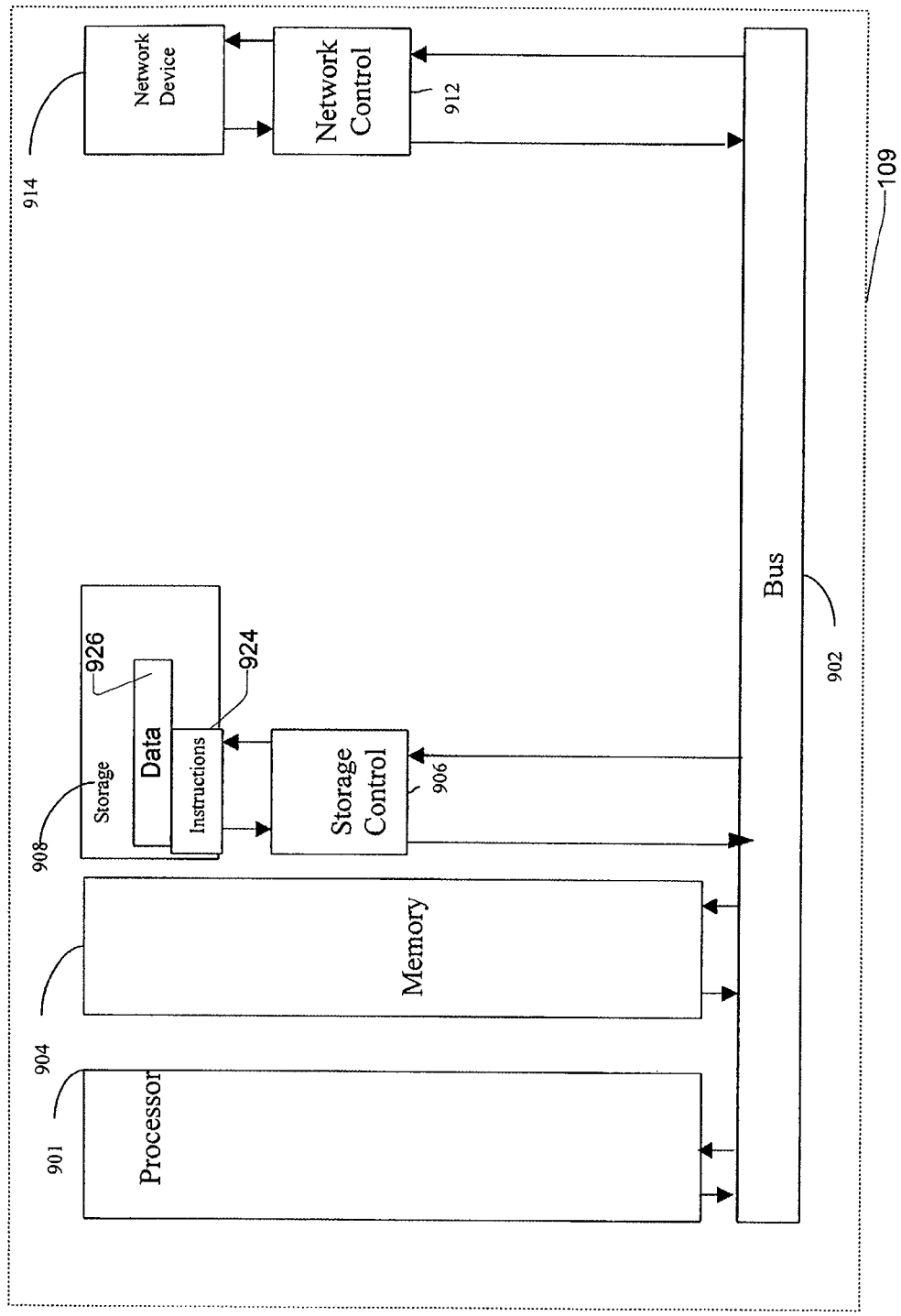
FIG. 9 is an architecture diagram of an exemplary master promotional controller in accordance with an exemplary embodiment of the present invention.

FIG. 9 is an architecture diagram of an exemplary promotional master promotional controller in accordance with an exemplary embodiment of the present invention. A master promotional controller includes a processor 901 operatively coupled via a system bus 902 to a main memory 904. The processor is also coupled to a storage device 908 via a storage controller 906 and the bus. In operation, program instructions 924 implementing a master promotional controller are stored on the storage device until the processor retrieves the program instructions and stores them in the main memory. The processor then executes the computer program instructions stored in the main memory to implement the features of a master promotional controller as described above.

The processor is further coupled to a network device 914 via a network device controller 912 and the bus. The process uses the network device to communicate with other processing systems, such as a vending promotional printer or a vending machine controller as previously described.

Although this invention has been described in certain specific embodiments, many additional modifications and variations would be apparent to those skilled in the art. For example, while the forgoing description is for a vending environment, the illustrated processes may be applied to any environment wherein promotional printing may be desired, such as in a casino for gaming machines, point-of-sale or product display coupon printing, and the like. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of printing a promotional coupon by a system including a promotional controller coupled to a financial transaction promotional printer of a financial transaction machine that is a vending machine, the method comprising:
    transmitting, by the promotional controller, coupon data to the financial transaction promotional printer;
    receiving, by the financial transaction promotional printer, the coupon data from the promotional controller via an auxiliary communication port coupling the financial transaction promotional printer to the promotional controller separately from a financial transaction machine controller, the auxiliary communication port constructed to receive the coupon data separately from a main communication port, the main communication port coupling the financial transaction promotional printer to the financial transaction machine controller for receiving financial transaction data;
    receiving, by the financial transaction promotional printer, the financial transaction data from the financial transaction machine controller via the main communication port;
    generating, by the financial transaction promotional printer, a receipt using the financial transaction data;
    generating, by the promotional controller, a trigger using trigger data, the trigger data including a location row and location column within the vending machine of a vended product;
    transmitting, by the promotional controller to the financial transaction promotional printer via the auxiliary communication port, the trigger; and
    generating, by the financial transaction promotional printer, in response to the trigger, the coupon using the coupon data.

2. The method of claim 1, wherein the trigger data includes a date.

3. The method of claim 1, wherein the trigger data includes a time of day.

4. The method of claim 1, wherein the trigger data includes a frequency of issuance of the coupon.

5. The method of claim 1, wherein the trigger data includes a frequency of issuance of the coupon.

6. The method of claim 1, wherein the trigger data includes an amount of money deposited in the vending machine.

7. The method of claim 1, wherein the trigger data includes a cost of the vended product.

8. The method of claim 1, wherein the trigger data includes a type of the vended product.

9. The method of claim 1, further comprising:
    storing of coupon issuance data by the financial transaction promotional printer; and
    transmitting the coupon issuance data by the financial transaction promotional printer to the promotional controller via the auxiliary communication port.

10. A system, comprising:
    a promotional controller and a financial transaction promotional printer of a financial transaction machine that is a vending machine,
    wherein the promotional controller comprises:
    a processor constructed to:
        transmit coupon data to the financial transaction promotional printer;
        generate a trigger using trigger data, the trigger data including a location row and location column within the vending machine of a vended product; and
        transmit to the financial transaction promotional printer the trigger, and
    wherein the financial transaction promotional printer comprises:
    a main communication port coupling the financial transaction promotional printer to a financial transaction machine controller, the main communication port constructed to receive financial transaction data from the financial transaction machine controller;
    an auxiliary communication port, separate from the main communication port, coupling the financial transaction promotional printer to the promotional controller, the auxiliary communication port constructed to receive the coupon data from the promotional controller separately of the financial transaction machine controller; and
    a printer processor constructed to:
    receive the financial transaction data from the financial transaction machine controller via the main communication port;
    generate a receipt using the financial transaction data;
    receive the coupon data from the promotional controller via the auxiliary communication port; and
    receive the trigger from the promotional controller via the auxiliary communication port; and
    generate, in response to the trigger, the coupon using the coupon data.

11. The system of claim 10, wherein the financial transaction promotional printer stores coupon issuance data, the processor of the promotional controller further constructed to receive the coupon issuance data from the financial transaction promotional printer via the auxiliary communication port.

12. The system of claim 10, wherein the processor of the promotional controller is further constructed to transmit variable data to the financial transaction promotional printer via the auxiliary communication port, the variable data for use by the financial transaction promotional printer when generating the coupon.

13. The system of claim 10, wherein the trigger data includes a date.

14. The system of claim 10, wherein the trigger data includes a time of day.

15. The system of claim 10, wherein the trigger data includes a frequency of issuance of the coupon.

16. The system of claim 10, wherein the trigger data includes a time of vending.

17. The system of claim 10, wherein the coupon data includes a template used to generate the coupon.

18. The system of claim 10, wherein the promotional controller is connected directly to the financial transaction promotional printer via the auxiliary communication port.

19. The system of claim 10, wherein the promotional controller is connected by a communications network to the financial transaction promotional printer via the auxiliary communication port.

20. The method of printing a promotional coupon of claim 1, further comprising transmitting, by the promotional controller to the financial transaction promotional printer via the auxiliary communication port, variable data, the variable data for use by the financial transaction promotional printer when generating the coupon.

21. The method of printing a promotional coupon of claim 1, wherein the coupon data includes a template used to generate the coupon.

22. The method of printing a promotional coupon of claim 1, wherein the promotional controller is connected directly to the financial transaction promotional printer via the auxiliary communication port.

23. The method of printing a promotional coupon of claim 1, wherein the promotional controller is connected by a communications network to the financial transaction promotional printer via the auxiliary communication port.

* * * * *